(12) United States Patent
Arakawa et al.

(10) Patent No.: US 7,493,897 B2
(45) Date of Patent: Feb. 24, 2009

(54) FUEL SUPPLY APPARATUS AND FUEL SUPPLY CONTROL APPARATUS FOR INTERNAL-COMBUSTION ENGINE

(75) Inventors: Miyao Arakawa, Nagoya (JP); Yoshiaki Nishijima, Toyokawa (JP); Masatoshi Kuroyanagi, Kariya (JP); Yoshimichi Kiyozumi, Sendai (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/873,609

(22) Filed: Oct. 17, 2007

(65) Prior Publication Data
US 2008/0092851 A1 Apr. 24, 2008

(30) Foreign Application Priority Data
Oct. 23, 2006 (JP) .............................. 2006-287584

(51) Int. Cl.
*F02B 1/00* (2006.01)
*F02B 1/08* (2006.01)
(52) U.S. Cl. ....................................... 123/576; 123/304
(58) Field of Classification Search ................. 123/514, 123/575, 576, 495, 1 A, 304, 557, 179.7, 123/179.8
See application file for complete search history.

(56) References Cited

U.S. PATENT DOCUMENTS

| | | | | |
|---|---|---|---|---|
| 4,031,864 A | * | 6/1977 | Crothers | 123/1 A |
| 4,210,103 A | * | 7/1980 | Dimitroff et al. | 123/1 A |
| 4,403,576 A | * | 9/1983 | Dimitroff et al. | 123/3 |
| 5,190,014 A | * | 3/1993 | Suga et al. | 123/519 |
| 7,337,754 B2 | * | 3/2008 | Dearth et al. | 123/1 A |
| 2007/0215127 A1 | * | 9/2007 | Dearth et al. | 123/568.15 |

FOREIGN PATENT DOCUMENTS

| | | |
|---|---|---|
| JP | 61-011445 | 1/1986 |
| JP | 05-209565 | 8/1993 |
| JP | 2004-019614 | 1/2004 |

OTHER PUBLICATIONS

U.S. Application of Arakawa et al; U.S. Appl. No. 11/949,857, filed Dec. 4, 2007.

* cited by examiner

*Primary Examiner*—Mahmoud Gimie
(74) *Attorney, Agent, or Firm*—Nixon & Vanderhye PC

(57) ABSTRACT

A fuel supply apparatus includes a component adjustment unit, a low-pressure side passage, and a valve. The unit adjusts component composition of fuel by separating a particular component from fuel. The unit includes a component separation wall, which divides an interior of a portion of a fuel supply passage between an anterior chamber and a posterior chamber. The wall includes a separation membrane, which the particular component of fuel in the anterior chamber selectively permeates to be separated. The particular component after passing through the wall is temporarily stored in the posterior chamber. When the low-pressure side passage connected to the posterior chamber is opened by the valve, the particular component is separated. Fuel, from which the particular component is separated, is supplied to an injection valve from the anterior chamber. When the low-pressure side passage is closed by the valve, the separation of the particular component is restricted.

8 Claims, 5 Drawing Sheets

FUEL SUPPLY APPARATUS AND FUEL SUPPLY CONTROL APPARATUS FOR INTERNAL-COMBUSTION ENGINE

CROSS REFERENCE TO RELATED APPLICATION

This application is based on and incorporates herein by reference Japanese Patent Application No. 2006-287584 filed on Oct. 23, 2006.

BACKGROUND OF THE INVENTION

1. Field of the Invention

The present invention relates to a fuel supply apparatus and a fuel supply control apparatus for an internal-combustion engine.

2. Description of Related Art

Reduction in environment pollution caused by exhaust gas, and a response to resource depletion are formidable challenges to a current transportation system led by automobiles. Development of alternative fuel to conventional hydrocarbon fuel, and improvement of gasoline and light oil fuel are under consideration as alternative fuels to automotive fuel. The improved gasoline and light oil fuel can be employed in an existing engine without modification, which is advantageous on the cost front. For example, mixed fuel as a result of mixing inexpensive alcohol into gasoline, and fuel as a result of reducing aromatic components in gasoline are known.

However, mixed fuel including alcohol has poor ignition performance as compared to gasoline fuel, thereby deteriorating starting performance at low temperature or in a cold region. Furthermore, since alcohol is more easily vaporized than gasoline fuel, alcohol is vaporized in a fuel flow passage in an injection valve at the high-temperature restarting, so that a vapor lock may be caused.

In a conventional fuel supply device for alcohol mixed fuel according to JP61-11445A, a high molecular membrane for separating an alcohol component is provided in a fuel tank to store separately fuel having high concentration of alcohol and fuel having low concentration of alcohol, and there are two systems of fuel supply passages from two respective storage portions to an engine. The two systems of fuel supply passages are connected to a fuel passage leading to an injector via respective pumps. A change-over valve supplies or stops supplying fuel having high concentration of alcohol, so that fuel is supplied according to an operational condition of the engine.

In a fuel storage device for an engine according to JP5-209565A, a tank for alcohol-containing fuel and a tank for gasoline fuel are separately provided to selectively use alcohol-containing fuel or gasoline fuel according to an operational condition of the engine, without providing a separation membrane. In the fuel storage device, a fuel tank is divided between a first tank for gasoline fuel and a second tank for alcohol-containing fuel, and the first and second tanks are connected to a fuel pump through respective valves. Accordingly, fuel to be supplied to an injector from the fuel pump through a fuel supply pipe can be selected. In addition, an oil feeding detecting means and an alcohol concentration detecting means are provided, to prevent wrong fuel feeding.

Since gasoline fuel includes various kinds of components (e.g., paraffinic, olefinic, and aromatic), a part of the components cannot be vaporized at cold starting and is sometimes discharged without complete combustion. To combat this, a fuel supply unit having an aromatic component reduction device for reducing aromatic components in fuel is disclosed in JP2004-19614A. The fuel supply unit includes a tank, in which aromatic component reduced fuel is stored, and a means for circulating the aromatic components absorbed in the aromatic component reduction device to a fuel tank, to supply aromatic component reduced fuel in a warm-up process at starting of an engine, thereby reducing hydrocarbon in exhaust gas.

However, the device in JP61-11445A requires the two systems of fuel supply passages and pumps, which results in its complex configuration. Besides, the respective fuel supply passages join to be the fuel passage leading to the injector. Accordingly, even if the supply of alcohol fuel is stopped at the starting, a substantial amount of fuel having high concentration of alcohol, which is supplied before then, is left in a fuel pipe or a delivery pipe. As a result, fuel with its alcohol component separated cannot be promptly injected from the injector, and thereby a sufficient improvement effect on starting performance is not produced.

In the device disclosed in JP5-209565A as well, because alcohol-containing fuel and gasoline fuel flow through the same fuel passage on a downstream side of the fuel pump, prompt switching between fuels is not carried out, so that similar problems are caused. Furthermore, since the tank for alcohol-containing fuel and the tank for gasoline fuel are separately provided, it takes man-hours to feed fuel to each of the tanks, and an oil feeding time control means is needed to prevent wrong fuel feeding.

In the unit disclosed in JP2004-19614A, the aromatic component reduction device and the aromatic component reduced fuel tank, which is on a downstream side of the aromatic component reduction device, are provided independently of the fuel tank, so that the unit tends to grow in size. Moreover, since each tank is connected to a passage inside an engine through a fuel pipe, fuel is left in a delivery pipe, so that similar problems about starting performance are caused.

SUMMARY OF THE INVENTION

The present invention addresses the above disadvantages. Thus, it is an objective of the present invention to supply a plurality of fuels to an injector of an internal-combustion engine using a simple configuration, and to improve startability by supplying desired fuel, particularly fuel having high ignition performance or good combustibility, to a delivery pipe and the injector immediately after starting of the engine.

To achieve the objective of the present invention, there is provided a fuel supply apparatus for an internal-combustion engine. The apparatus supplies fuel stored in a fuel tank to an injection valve of the internal-combustion engine through a fuel supply passage and a fuel pump disposed in the fuel supply passage. The apparatus includes a component adjustment unit, a low-pressure side passage, and a valve. The component adjustment unit is for adjusting component composition of fuel by separating a particular component from fuel. The component adjustment unit is provided in a portion of the fuel supply passage near the injection valve. The component adjustment unit includes a component separation wall, which divides an interior of the portion of the fuel supply passage between an anterior chamber and a posterior chamber, The anterior chamber has a fuel inlet, and fuel, the particular component of which is yet to be separated, flows into the anterior chamber through the fuel inlet from the fuel pump. The component separation wall includes a separation membrane, which the particular component of fuel in the anterior chamber selectively permeates to be separated, and a porous substrate, which supports the separation membrane. The particular component after passing through the component separation wall is temporarily stored in the posterior chamber. The low-pressure side passage connects the posterior chamber and the fuel tank. The valve is disposed in the low-pressure side passage to one of open and close the low-pressure side passage. When the low-pressure side passage is opened by the valve, the particular component of fuel in the anterior chamber is separated while passing through the component separation wall and stored in the posterior chamber, and fuel, from which the particular component is separated, is supplied to the injection valve from the anterior chamber. When the low-pressure side passage is closed by the valve, the separation of the particular component from fuel is restricted, so that fuel, the particular component of which is not separated, is supplied to the injection valve.

To achieve the objective of the present invention, there is also provided a fuel supply control apparatus for controlling the supply of fuel to the injection valve by one of opening and closing the valve. The apparatus includes the fuel supply apparatus and a valve control means. The valve control means is for opening the valve to separate the particular component of fuel in the anterior chamber through the component separation wall to be stored in the posterior chamber, using residual pressure of fuel in the anterior chamber, when the internal-combustion engine is stopped, and is for closing the valve to stop the separation of the particular component when the internal-combustion engine is started.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
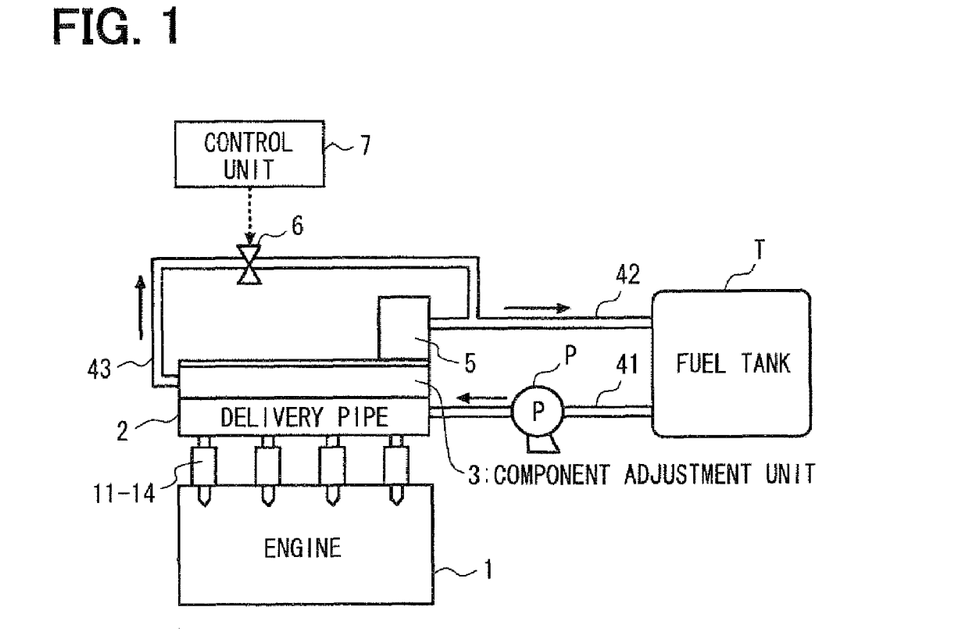
FIG. 1 is an overall schematic view illustrating a system configuration of a fuel supply apparatus and a fuel supply control apparatus for an internal-combustion engine according to a first embodiment of the present invention.

A first embodiment of a fuel supply apparatus and a fuel supply control apparatus for an internal-combustion engine, which apply the present invention, is described below with reference to FIGS. 1 to 5. FIG. 1 shows a schematic configuration of a fuel supply system according to the first embodiment. An engine 1, which is an internal-combustion engine, is explained as a four-cylinder engine. Injectors 11 to 14, each of which is an injection valve for injecting fuel into a combustion chamber of a corresponding cylinder, are disposed in the engine 1. The injectors 11 to 14 are connected to a delivery pipe 2, which is a common fuel supply chamber of the injectors 11 to 14.

Gasoline fuel (hereinafter referred to as alcohol mixed gasoline fuel), with which alcohol is mixed, is stored in a fuel tank T. Fuel, which is pressurized through a fuel pump P disposed in a fuel supply pipe 41, is supplied to each of the injectors 11 to 14 through the delivery pipe 2. The fuel supply pipe 41 and the delivery pipe 2 constitute a fuel supply passage. Pressure of fuel in the delivery pipe 2 is regulated by a pressure regulator 5. Surplus fuel is returned to the fuel tank T through a fuel return pipe 42 connected to the pressure regulator 5.

The delivery pipe 2 includes a component adjustment unit 3, which is a characterizing portion of the present invention. The component adjustment unit 3 has a function of adjusting fuel component composition by separating a particular component in fuel, namely an alcohol component in alcohol mixed gasoline fuel in this example. The separated alcohol component is collected through an alcohol collection pipe 43, which is connected to the fuel return pipe 42, and is returned to the fuel tank T. The fuel return pipe 42 has an electromagnetic valve 6, which is an on-off valve. The separation and collection of the alcohol component are controlled in a control unit 7, which serves as an on-off valve control means, Various sensors (not shown), which detect an engine rotational speed, and the other engine operational conditions, are connected to the control unit 7.

Figure 2:
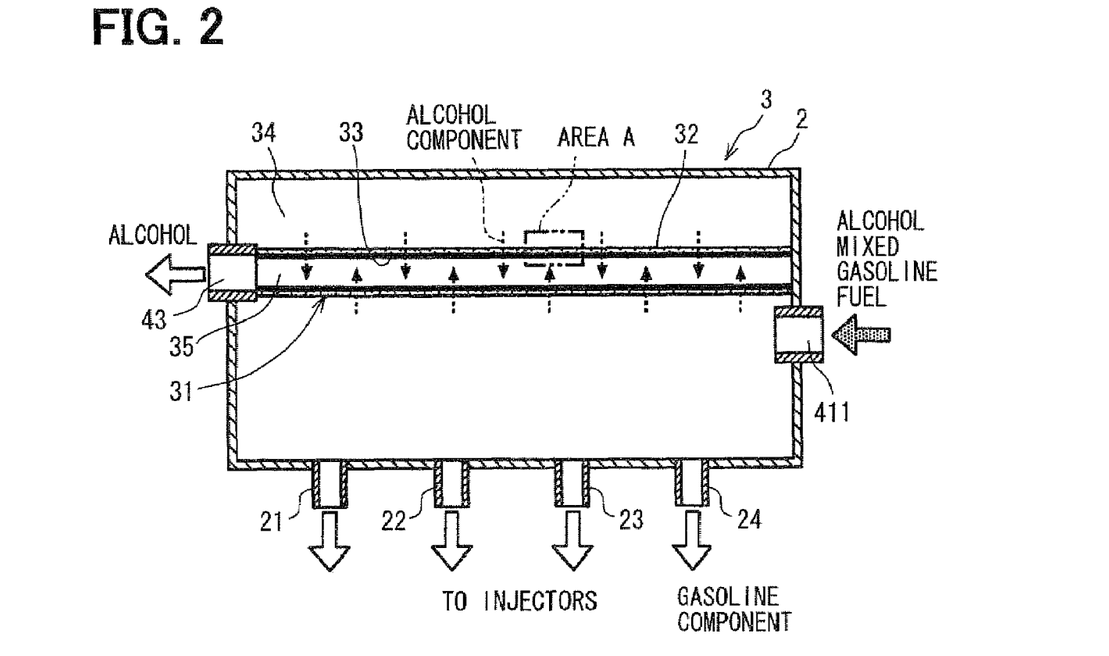
FIG. 2 is a schematic view illustrating an overall configuration of a component adjustment unit according to the first embodiment.

The component adjustment unit 3 is described in detail below with reference to FIGS. 2 to 4. In FIG. 2, alcohol mixed gasoline fuel is drawn into the delivery pipe 2 through the fuel supply pipe 41, which opens on a side wall of the delivery pipe 2. On a bottom surface of the delivery pipe 2, outlet pipes 21 to 24, which are connected to the injectors 11 to 14 respectively, are formed in a projecting fashion. The component adjustment unit 3 has a component separation wall 31 including a pipe-like porous substrate 32 and a fuel component separation membrane 33. In FIG. 2, the porous substrate 32 is disposed in a bridging manner between right and left side walls of the delivery pipe 2. The fuel component separation membrane 33 is formed to be stacked on an inner circumferential wall of the porous substrate 32, and serves as a separation membrane, which the alcohol component is made to selectively permeate.

One end portion of the component separation wall 31 is held and fixed on the right side wall of the delivery pipe 2, and the other end portion of the component separation wall 31 is connected and fixed to the alcohol collection pipe 43, which opens on the left side wall of the delivery pipe 2. An open end portion of the fuel supply pipe 41 is a fuel inlet 411 into the delivery pipe 2. Accordingly, a space inside the delivery pipe 2 is divided between two chambers with the component separation wall 31. A chamber on an outer circumferential side of the component separation wall 31 is an anterior chamber 34. Fuel, a component of which is yet to be adjusted, flows into the anterior chamber 34 through the fuel inlet 411. A chamber on an inner circumferential side of the component separation wall 31 is a posterior chamber 35. The alcohol component that passes through the component separation wall 31 is temporarily stored in the posterior chamber 35. The posterior chamber 35 communicates with the fuel return pipe 42 leading into the fuel tank T, through the alcohol collection pipe 43, which serves as a low-pressure side passage, and the electromagnetic valve 6.

Fuel, which is to flow into the anterior chamber 34, is pressurized to have a predetermined pressure by the fuel pump P and the pressure regulator 5. The posterior chamber 35 communicates with the low-pressure fuel return pipe 42. Accordingly, by opening the electromagnetic valve 6 by the control unit 7, pressure in the posterior chamber 35, which communicates with the low-pressure side passage, is made low, and a pressure difference is caused between the posterior chamber 35 and the anterior chamber 34, into which fuel pressurized by the fuel pump P flows. The alcohol component in fuel is made to pass through the component separation wall 31 using the pressure difference between the inside and outside of the component separation wall 31, and is thereby separated to be in the posterior chamber 35 while passing through the component separation wall 31 from the anterior chamber 34 to the posterior chamber 35. By closing the electromagnetic valve 6, there is no pressure difference between the inside and outside of the component separation wall 31, so that the separation of the alcohol component is stopped.

Figure 3A:
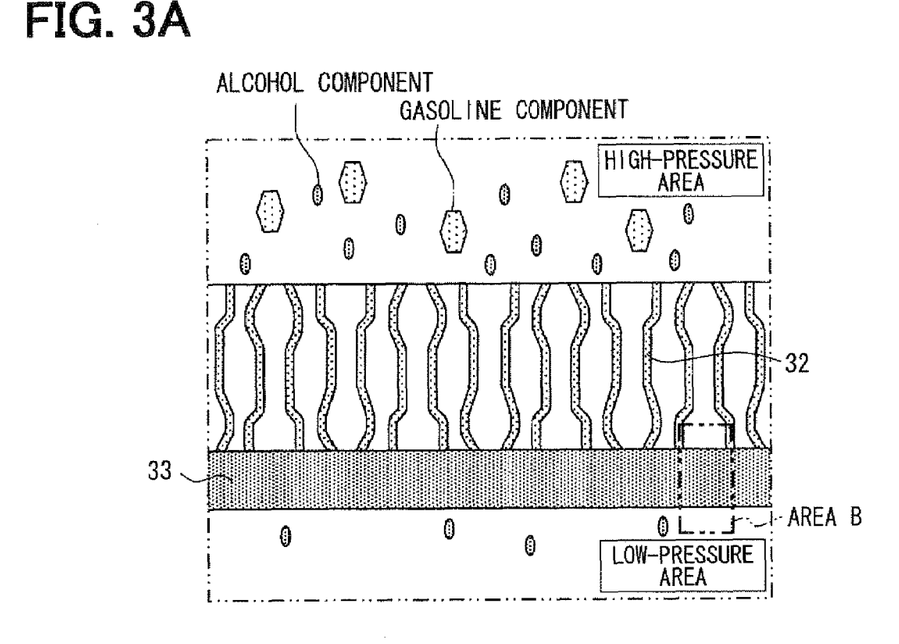
FIG. 3A is an enlarged view of an area A in FIG. 2.
Figure 3B:
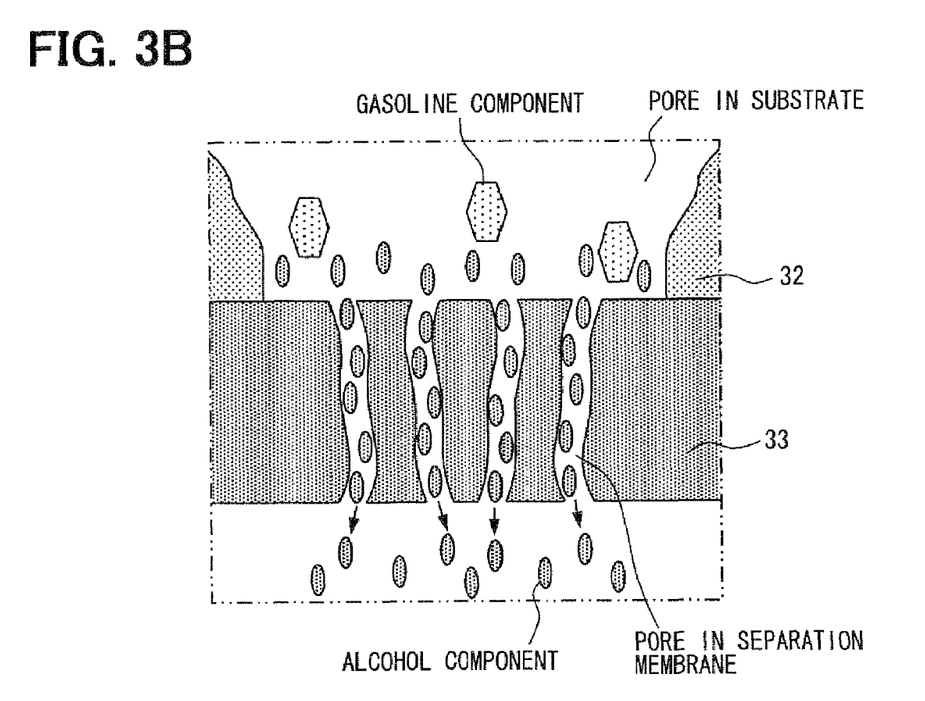
FIG. 3B is an enlarged view of an area B in FIG. 3A.

FIG. 3A, which is an enlarged view of an area A in FIG. 2, shows a detailed structure of the component separation wall 31. The porous substrate 32, which serves as an outer circumferential wall of the component separation wall 31, is a porous pipe including, for example, ceramics such as mullite, or metal such as a stainless steel. The porous substrate 32 has a plurality of pores, through which the alcohol component in fuel is easily able to pass. The pore is normally set to have a size in a range of approximately 10 nm to 100 µm, and may be formed to have a larger size than a pore of the fuel component separation membrane 33. When the porous substrate 32 is made of porous ceramics, mullite may be used at a low price as the porous ceramics, so that production costs are kept down. When the porous substrate 32 is made of a porous metal, materials having a mesh structure made of fine metallic wires or porous materials made of fine metallic fiber may be used as the porous metal.

The fuel component separation membrane 33, which serves as an inner circumferential wall of the component separation wall 31, is formed to cover the entire inner circumferential surface of the porous substrate 32. As a detailed structure of the fuel component separation membrane 33 is shown in FIG. 3B, which is an enlarged view of an area B in FIG. 3A, a size of a pore of the fuel component separation membrane 33 is normally in a range of approximately 0.3 to 10 nm. When the separation is performed by molecular sieving, the size of the pore of the fuel component separation membrane 33 may be set to be smaller than a size of a gasoline component in fuel. When the separation is performed using a difference in degree of adsorption, the size of the pore may be set to be larger than the size of the gasoline component. Only the alcohol component is separated from alcohol mixed gasoline fuel using the molecular sieving or the difference in degree of adsorption.

A zeolite membrane (e.g., NA-X, NA-Y, T-type) or a mesoporous silica membrane, for example, may be suitably used as the fuel component separation membrane 33. These membranes include many pores having sizes that conform to a particular component, which is to be separated. Using the molecular sieving and the difference in degree of adsorption by the pores, the particular component can selectively permeate the membranes. Crystal growth by a hydrothermal synthesis method may be used as a means for forming the fuel component separation membrane 33 on the inner circumferential surface of the porous substrate 32. When wall thickness of the porous substrate 32 is set to be in a range of approximately 0.5 to 3 mm, for example, the fuel component separation membrane 33 may have thickness in a range of approximately 1 to 50 µm.

Figure 4:
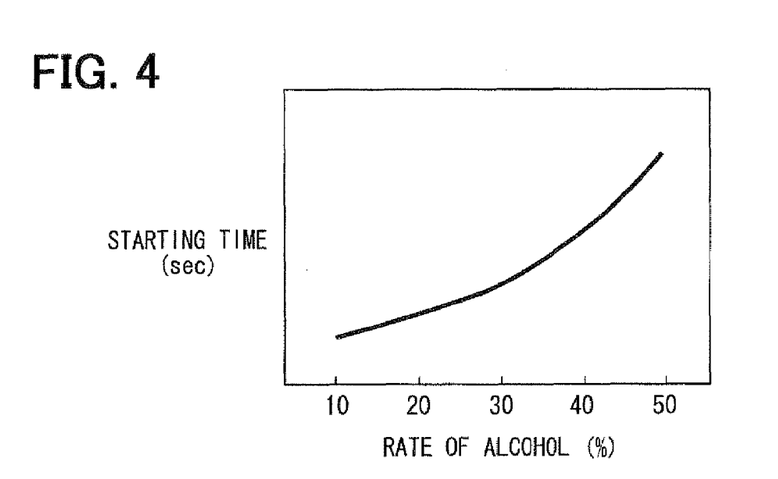
FIG. 4 is a graph illustrating a relationship between a rate of an alcohol component in fuel and a starting time in a cold condition according to the first embodiment.

FIG. 4 is a graph showing a relationship between a rate of the alcohol component in alcohol mixed gasoline fuel and cold startability. As shown in the graph, as the rate of the alcohol component becomes lower, starting time becomes shorter. Accordingly, the control unit 7 controls separation of more alcohol components from alcohol mixed gasoline fuel flowing into the delivery pipe 2, using a time period from a stop of the engine 1 to its following starting, to make fuel, which is supplied to the injectors 11 to 14 at the following starting, fuel having more gasoline components, which leads to high ignition performance.

Figure 5:
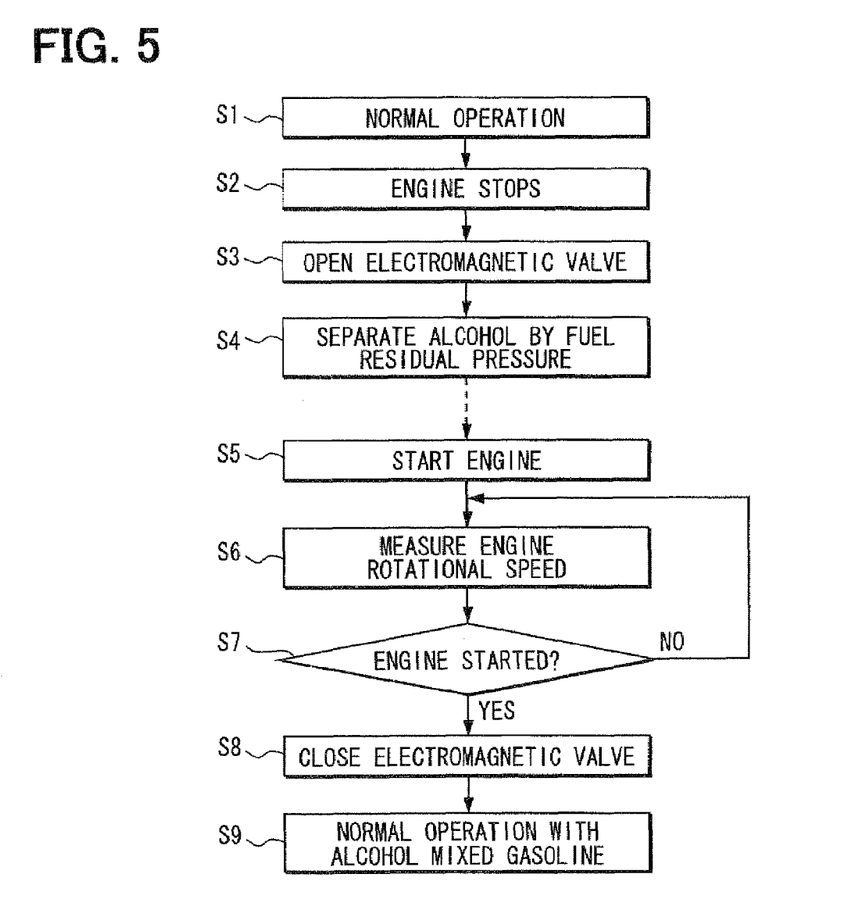
FIG. 5 is a flowchart illustrating workings of a control unit according to the first embodiment.

Using FIG. 5, workings of the fuel supply system carried out in the control unit 7 are described with reference to FIGS. 1 to 4. When the stop of the engine 1 is detected at step 2 (S2) in a state of normal operation at step 1 (S1), control proceeds to step 3 (S3) to open the electromagnetic valve 6. As a result, in the component adjustment unit 3 in the delivery pipe 2, the alcohol component in alcohol mixed gasoline fuel moves to the posterior chamber 35 after passing through the porous substrate 32 and the fuel component separation membrane 33 of the component separation wall 31 in this order because of fuel residual pressure in the anterior chamber 34 (step 4 (S4)). The alcohol component that fills the posterior chamber 35 is collected in the fuel tank T from the fuel return pipe 42 through the alcohol collection pipe 43 and the electromagnetic valve 6.

By appropriately setting pressure of fuel in the delivery pipe 2 by the pressure regulator 5, the separation of the alcohol component is promoted using the pressure difference between the anterior chamber 34 and the posterior chamber 35. By regulating the pressure of fuel not to be excessively applied, the component separation wall 31 is protected.

The above-described alcohol component separation process is continuously performed while the engine 1 is stopped, to decrease a concentration of the alcohol component in the anterior chamber 34 as far as possible. Accordingly, when the engine 1 is started at step 5 (S5), the starting by use of fuel having more gasoline components is made possible. At step 6 (S6), the engine rotational speed is measured. At step 7 (S7), it is determined whether the engine 1 is started, based on the engine rotational speed. When it is determined that the engine 1 is not started (No) at S7, the processing at S6 and S7 is repeatedly executed until it is determined that the engine 1 is started. When it is determined that the engine 1 is started (Yes) at S7, the electromagnetic valve 6 is closed at step 8 (S8). Consequently, the separation of the alcohol component is stopped, and after this, the normal operation is performed with alcohol mixed gasoline fuel (step 9 (S9)).

In the first embodiment, by providing the component adjustment unit 3 in the delivery pipe 2 on an immediate upstream side of the injectors 11 to 14, fuel having more gasoline components is supplied at the starting of the engine 1. As a result, the ignition performance is improved, and thus the startability is greatly improved. By dividing the delivery pipe 2 with the component separation wall 31, the component adjustment unit 3 is easily provided. Additionally, an installation space does not need to be newly created for the component adjustment unit 3, and the component adjustment unit 3 is on an immediate upstream side of the injectors 11 to 14. Consequently, fuel with its component adjusted is promptly and evenly supplied. Since a little fuel, that is, several cubic centimeters (cc) of fuel or less, is normally used at the starting, by providing the component adjustment unit 3 in the fuel supply passage near the injectors 11 to 14 to separate the alcohol component while the engine 1 is stopped, a concentration of the gasoline component in fuel supplied to the injectors 11 to 14 at the starting of the engine 1 is made high.

Figure 6:
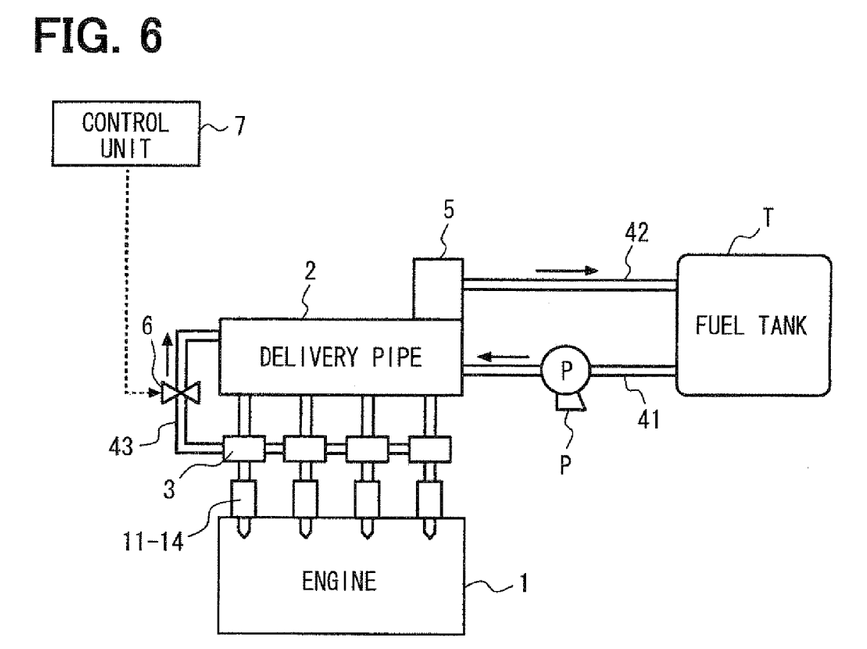
FIG. 6 is an overall schematic view illustrating a system configuration of a fuel supply apparatus and a fuel supply control apparatus for an internal-combustion engine according to a second embodiment of the present invention.

The component adjustment unit 3 is not necessarily disposed in the delivery pipe 2. When the component adjustment unit 3 is disposed closer to the injectors 11 to 14, less alcohol components are separated to increase the concentration of the gasoline component. A second embodiment of the present invention is shown in FIG. 6. As shown in FIG. 6, each component adjustment unit 3 is disposed halfway along a corresponding one of the outlet pipes 21 to 24 connecting the delivery pipe 2 and the injectors 11 to 14, respectively.

Figure 7:
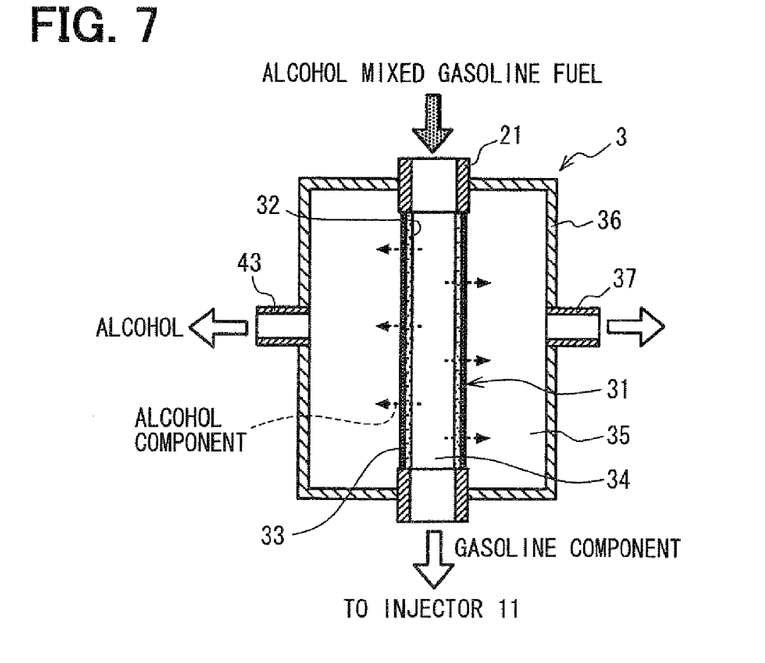
FIG. 7 is a schematic view illustrating an overall configuration of a component adjustment unit according to the second embodiment.

FIG. 7 is a schematic view showing a configuration of a component adjustment unit 3 of the second embodiment. In FIG. 7, as an example, the component adjustment unit 3 disposed between the injector 11 and the outlet pipe 21 is shown. The component adjustment unit 3 includes a container structure 36 and a component separation wall 31. The container structure 36 serves as an individual fuel supply chamber, and the component separation wall 31 is disposed in the container structure 36 in a vertical direction of FIG. 7. One end portion of the component separation wall 31 is connected and fixed to the outlet pipe 21, which opens on a central portion of an upper wall of the container structure 36, and the other end portion of the component separation wall 31 is connected and fixed to a connecting pipe to the injector 11, which opens on a central portion of a lower wall of the container structure 36. Component adjustment units 3, which are disposed between the other injectors 12 to 14 and the other outlet pipes 22 to 24 respectively, have similar configurations to the above-described configuration of the component adjustment unit 3.

A space inside the container structure 36 is divided between two chambers with the component separation wall 31. A chamber on an inner circumferential side of the component separation wall 31 is an anterior chamber 34, into which fuel before the component adjustment flows from the outlet pipe 21 that serves as a fuel inlet to the container structure 36. A chamber on an outer circumferential side of the component separation wall 31 is a posterior chamber 35, in which the alcohol component that has passed through the component separation wall 31 is temporarily stored. The posterior chamber 35 communicates with an alcohol collection pipe 43, which opens on a left side wall of the container structure 36, and communicates with another posterior chamber 35 in the adjacent component adjustment unit 3 through a connecting pipe 37, which opens on a right side wall of the container structure 36. Accordingly, the component adjustment units 3 arranged between the outlet pipes 21 to 24 and the injectors 11 to 14 respectively as shown in FIG. 6 communicate with each other through the corresponding connecting pipes 37. The separated alcohol component is collected through the alcohol collection pipe 43 after flowing through the respective posterior chambers 35 in the component adjustment units 3 adjacent to each other via the connecting pipes 37.

In the second embodiment, the component separation wall 31 includes a porous substrate 32 on its inner circumferential wall side and a fuel component separation membrane 33 on its outer circumferential wall side. Accordingly, the fuel component separation membrane 33 has a larger area, thereby increasing a separation amount. Materials and formation methods of the porous substrate 32 and the fuel component separation membrane 33 may be similar to the above-described first embodiment. In this manner, the porous substrate 32 is provided to surround the anterior chamber 34, into which fuel before the component adjustment flows, and the fuel component separation membrane 33 is formed being stacked on the porous substrate 32 to cover the entire outer circumferential surface of the porous substrate 32. As a result, the alcohol component is smoothly separated from alcohol mixed gasoline fuel using pressure of fuel in the anterior chamber 34.

Control of an electromagnetic valve 6 by a control unit 7 and workings of the component adjustment units 3 are similar to the above-described first embodiment. When the engine 1 is stopped, the electromagnetic valve 6 is opened to start the separation of the alcohol component, so that fuel having more gasoline components is stored in the anterior chamber 34. In the configuration of the component adjustment units 3 according to the second embodiment, since the anterior chamber 34 has small volume, the separation of the alcohol component is promptly carried out. Accordingly, fuel with high ignition performance is immediately supplied to the injectors 11 to 14 at the starting of the engine 1, thereby improving starting performance-enhancing effects.

Figure 8:
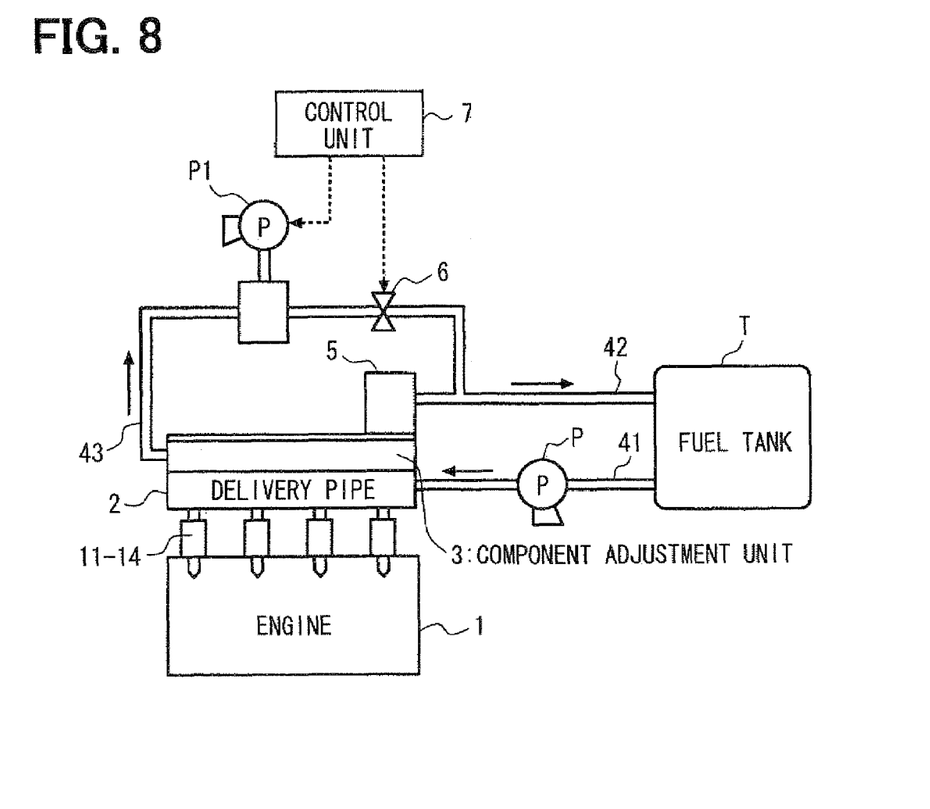
FIG. 8 is an overall schematic view illustrating a system configuration of a fuel supply apparatus and a fuel supply control apparatus for an internal-combustion engine according to a third embodiment of the present invention.

In order to promote the separation of the alcohol component, it is preferable that the pressure difference between the anterior chamber 34 and the posterior chamber 35 in the component adjustment unit 3 be large. A third embodiment of the present invention is shown in FIG. 8, in which a decompression pump P1 is disposed in an alcohol collection pipe 43 that serves as the low-pressure side passage. A basic configuration in the third embodiment is similar to the above-described first embodiment. That is, a component adjustment unit 3 is disposed in a delivery pipe 2.

As shown in FIG. 8, the decompression pump P1 is disposed between an electromagnetic valve 6 and the delivery pipe 2, and is controlled to operate by a control unit 7. In the third embodiment, when the engine 1 is stopped, the electromagnetic valve 6 is opened and the decompression pump P1 is actuated to start the separation of the alcohol component. By making pressure in the posterior chamber 35 even lower, the pressure difference between the anterior chamber 34 and the posterior chamber 35 becomes great. As a result, since a speed of the separation of the alcohol component increases, the separation of the alcohol component is promoted even in the configuration whereby the component adjustment unit 3 is disposed in a delivery pipe 2 having large volume. Thus, fuel with high ignition performance is immediately supplied to the injectors 11 to 14 at the starting of the engine 1, thereby improving starting performance-enhancing effects.

In addition, the decompression pump P1 in the third embodiment may be applied to the configuration in the above-described second embodiment, as well as the configuration in the above-described first embodiment.

Figure 9:
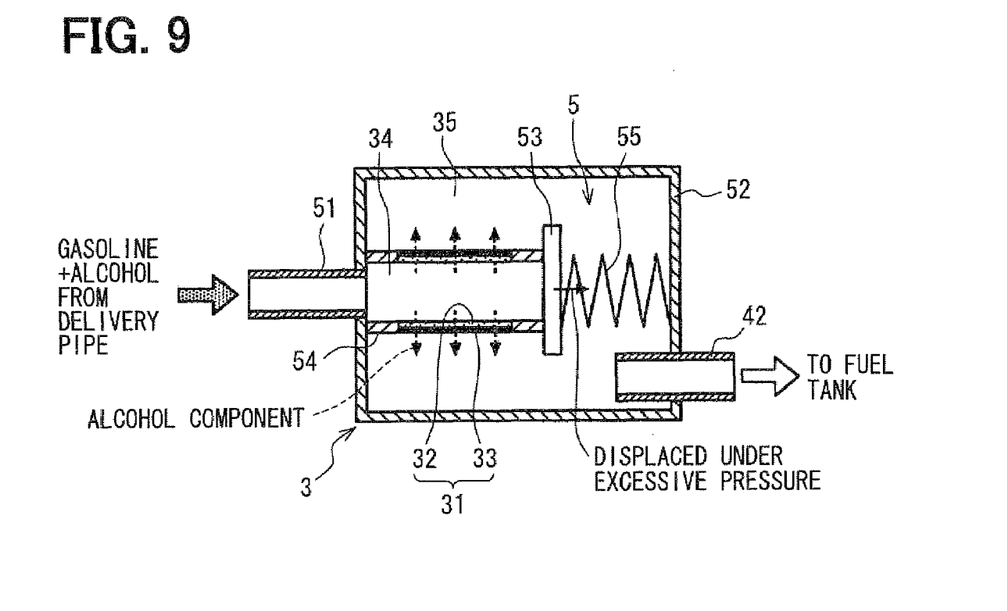
FIG. 9 is a schematic view illustrating an overall configuration of a component adjustment unit in a fuel supply apparatus for an internal-combustion engine according to a fourth embodiment of the present invention.

A fourth embodiment of the present invention is shown in FIG. 9. As shown in FIG. 9, a component adjustment unit 3 is disposed in a pressure regulator 5, which regulates pressure of fuel in the delivery pipe 2.

In FIG. 9, the pressure regulator 5 has a valve 53 in a container structure 52 disposed between a connecting pipe 51 leading to the delivery pipe 2, and a fuel return pipe 42. The valve 53 is opened by fuel pressure, and is pressed by spring force of a spring 55 to close an open end portion of an inflow pipe 54, into which alcohol mixed gasoline fuel flows from the connecting pipe 51. The valve 53 is regulated to open or close by the spring force of the spring 55. The valve 53 opens when pressure of fuel flowing into the inflow pipe 54 is larger than the spring force of the spring 55, so that surplus fuel is discharged through the fuel return pipe 42.

In the fourth embodiment, the component adjustment unit 3 is configured such that a portion of a pipe wall of the inflow pipe 54 has a structure of the above-described component separation wall 31. More specifically, an intermediate portion of the inflow pipe 54 is formed into a porous substrate 32, which is a porous pipe, and a fuel component separation membrane 33 is formed being stacked on the porous substrate 32 to cover the entire outer circumferential surface of the porous substrate 32. Accordingly, an anterior chamber 34 is formed on an inner circumferential side of the inflow pipe 54, and a posterior chamber 35 is formed on an outer circumferential side of the inflow pipe 54 in the container structure 52. Fuel before the component adjustment flows into the anterior chamber 34, and the separated alcohol component is temporarily stored in the posterior chamber 35.

In the fourth embodiment as well control of an electromagnetic valve 6 by a control unit 7 and workings of the component adjustment unit 3 are similar to the above-described embodiments. When the engine 1 is stopped, the electromagnetic valve 6 is opened to start the separation of the alcohol component in the component adjustment unit 3. Consequently, fuel having more gasoline components is stored in the anterior chamber 34 and the delivery pipe 2, which communicates with the anterior chamber 34. Thus, fuel with high ignition performance is supplied to the injectors 11 to 14, thereby producing similar starting performance-enhancing effects.

In this manner, according to the present invention, the component adjustment unit 3 is disposed in the fuel supply passage on a downstream side of the fuel pump P, particularly in the delivery pipe 2 on an immediate upstream side of the injectors 11 to 14, in the pressure regulator 5 connected to the delivery pipe 2, or halfway along the corresponding one of the outlet pipes 21 to 24 between the delivery pipe 2 and the respective injectors 11 to 14. As a result, fuel with the high concentration of the gasoline component is promptly supplied to the injectors 11 to 14, and thereby the starting performance of the engine 1 is improved.

Additionally, in the above-described embodiments, the component adjustment unit 3, which adjusts fuel component composition by separating the alcohol component in alcohol mixed gasoline fuel, is described. However, the present invention is not limited to the component adjustment unit 3, but may be applied to a unit for adjusting the fuel component composition through separation of light oil, n-paraffin constituents, or aromatic components in gasoline fuel.

Additional advantages and modifications will readily occur to those skilled in the art. The invention in its broader terms is therefore not limited to the specific details, representative apparatus, and illustrative examples shown and described.

What is claimed is:

1. A fuel supply apparatus for an internal-combustion engine, the apparatus supplying fuel stored in a fuel tank to an injection valve of the internal-combustion engine through a fuel supply passage and a fuel pump disposed in the fuel supply passage and comprising:

a component adjustment unit for adjusting component composition of fuel by separating a particular component from fuel, the component adjustment unit provided in a portion of the fuel supply passage near the injection valve, wherein:

the component adjustment unit includes a component separation wall, which divides an interior of the portion of the fuel supply passage between an anterior chamber and a posterior chamber;

the anterior chamber has a fuel inlet, and fuel, the particular component of which is yet to be separated, flows into the anterior chamber through the fuel inlet from the fuel pump; and the component separation wall includes a separation membrane, which the particular component of fuel in the anterior chamber selectively permeates to be separated, and a porous substrate, which supports the separation membrane, wherein the particular component after passing through the component separation wall is temporarily stored in the posterior chamber;

a low-pressure side passage that connects the posterior chamber and the fuel tank; and a valve disposed in the low-pressure side passage to one of open and close the low-pressure side passage, wherein:

when the low-pressure side passage is opened by the valve, the particular component of fuel in the anterior chamber is separated while passing through the component separation wall and stored in the posterior chamber, and fuel, from which the particular component is separated, is supplied to the injection valve from the anterior chamber; and when the low-pressure side passage is closed by the valve, the separation of the particular component from fuel is restricted, so that fuel, the particular component of which is not separated, is supplied to the injection valve.

2. The fuel supply apparatus according to claim 1, wherein the particular component of fuel in the anterior chamber is separated while passing through the component separation wall and stored in the posterior chamber because of a difference between pressure in the posterior chamber, which is connected to the low-pressure side passage, and pressure in the anterior chamber, into which fuel pressurized by the fuel pump flows.

3. The fuel supply apparatus according to claim 1, further comprising a decompression pump in the low-pressure side passage, which is connected to the posterior chamber.

4. The fuel supply apparatus according to claim 1, wherein:

the injection valve is one of a plurality of injection valves; and the portion of the fuel supply passage includes a common fuel supply chamber, which is connected to the plurality of injection valves, so that the component adjustment unit is provided in the common fuel supply chamber.

5. The fuel supply apparatus according to claim 1, wherein:

the component adjustment unit is one of a plurality of component adjustment units;

the injection valve is one of a plurality of injection valves;

the portion of the fuel supply passage includes a plurality of individual fuel supply chambers, each of which is connected to a corresponding one of the plurality of injection valves; and each of the plurality of component adjustment units is provided in a corresponding one of the plurality of individual fuel supply chambers.

6. The fuel supply apparatus according to claim 1, wherein the separation membrane is one of a zeolite membrane and a mesoporous silica membrane.

7. A fuel supply control apparatus for controlling the supply of fuel to an injection valve of an internal-combustion engine by one of opening and closing a control valve, the apparatus comprising:

a fuel supply apparatus for an internal-combustion engine, the apparatus supplying fuel stored in a fuel tank to the injection valve through a fuel supply passage and a fuel pump disposed in the fuel supply passage and including:

a component adjustment unit for adjusting component composition of fuel by separating a particular component from fuel, the component adjustment unit provided in a portion of the fuel supply passage near the injection valve, wherein:

the component adjustment unit includes a component separation wall, which divides an interior of the portion of the fuel supply passage between an anterior chamber and a posterior chamber;

the anterior chamber has a fuel inlet, and fuel, the particular component of which is yet to be separated, flows into the anterior chamber through the fuel inlet from the fuel pump; and the component separation wall includes a separation membrane, which the particular component of fuel in the anterior chamber selectively permeates to be separated, and a porous substrate, which supports the separation membrane, wherein the particular component after passing through the component separation wall is temporarily stored in the posterior chamber;

a low-pressure side passage that connects the posterior chamber and the fuel tank; and the control valve is disposed in the low-pressure side passage to one of open and close the low-pressure side passage, wherein:

when the low-pressure side passage is opened by the control valve, the particular component of fuel in the anterior chamber is separated while passing through the component separation wall and stored in the posterior chamber, and fuel, from which the particular component is separated, is supplied to the injection valve from the anterior chamber; and when the low-pressure side passage is closed by the control valve, the separation of the particular component from fuel is restricted, so that fuel, the particular component of which is not separated, is supplied to the injection valve; and a valve control means for opening the control valve to separate the particular component of fuel in the anterior chamber through the component separation wall to be stored in the posterior chamber, using residual pressure of fuel in the anterior chamber, when the internal-combustion engine is stopped, and for closing the control valve to stop the separation of the particular component when the internal-combustion engine is started.

8. The fuel supply control apparatus according to claim 7, wherein the valve control means determines whether the internal-combustion engine is started based on a rotational speed of the internal-combustion engine, and when it is determined that the internal-combustion engine is started, the valve control means closes the control valve.

* * * * *